US010523310B2

United States Patent
Naseef

(10) Patent No.: US 10,523,310 B2
(45) Date of Patent: Dec. 31, 2019

(54) MOBILE DEVICE AND METHOD FOR WIRELESS COMMUNICATION WITH AT LEAST ONE FLYING OBJECT

(71) Applicant: Rohde & Schwarz GmbH & Co. KG, Munich (DE)

(72) Inventor: Mahmud Naseef, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 15/478,477

(22) Filed: Apr. 4, 2017

(65) Prior Publication Data
US 2018/0287693 A1    Oct. 4, 2018

(51) Int. Cl.
*H04B 7/185* (2006.01)

(52) U.S. Cl.
CPC ..... *H04B 7/18506* (2013.01); *H04B 7/18513* (2013.01)

(58) Field of Classification Search
CPC .................................. H04B 7/185; H04B 7/04
See application file for complete search history.

(56) References Cited

U.S. PATENT DOCUMENTS

| 6,034,634 A * | 3/2000 | Karlsson ................. H01Q 3/08 342/359 |
| 6,151,496 A * | 11/2000 | Richards ................. H01Q 3/08 455/428 |
| 2002/0081969 A1 * | 6/2002 | Chang .................... H01Q 1/007 455/13.1 |
| 2018/0076869 A1 * | 3/2018 | Aue ..................... H04B 7/0617 |

FOREIGN PATENT DOCUMENTS

CN    104682017 A    6/2015

* cited by examiner

*Primary Examiner* — Dong-Chang Shiue
(74) *Attorney, Agent, or Firm* — Potomac Technology Law, LLC

(57) ABSTRACT

A mobile device is used for wireless communication with at least one flying object. The mobile device receives information from a first flying object via an actual communication channel. Furthermore, the mobile device comprises a beamforming unit for forming at least two beams. In addition to this, the beamforming unit is configured to steer a beam of the actual communication channel or an actual communication antenna of the mobile device based on the information received from the first flying object by the mobile device.

16 Claims, 3 Drawing Sheets

MOBILE DEVICE AND METHOD FOR WIRELESS COMMUNICATION WITH AT LEAST ONE FLYING OBJECT

TECHNICAL FIELD

The invention relates to a mobile device and a method for wireless communication with at least one flying object, and to a system comprising the mobile device for wireless communication with at least one flying object.

BACKGROUND

Generally, in times of an increasing number of wireless communication applications (e.g., mobile communications) employing flying objects such as satellites for communication, there is a growing need for a mobile device and a method for wireless communication with at least one flying object.

The China patent publication CN104682017A discloses a multi-beam phased-array antenna for satellite communications and a system with a multi-beam satellite. However, said document does not show a mobile device for wireless communication with the satellite in a most efficient manner nor the corresponding method.

Accordingly, there is a need for a mobile device and a method for wireless communication with at least one flying object (e.g., at least one satellite), in an efficient manner, including establishment and management of the respective communication channel.

SOME EXAMPLE EMBODIMENTS

Embodiments of the present invention advantageously address the foregoing requirements and needs, as well as others, by providing a mobile device and a method for wireless communication with at least one flying object (e.g., at least one satellite), in an efficient manner, including establishment and management of the respective communication channel.

According to a first aspect of the invention, a mobile device for wireless communication with at least one flying object is provided. The mobile device receives information from a first flying object via an actual communication channel. In addition to this, the mobile device comprises at least one beamforming unit for forming at least two beams. In this context, the at least one beamforming unit is configured to steer a beam of the actual communication channel or an actual communication antenna of the mobile device based on the information received from the first flying object by the mobile device. Advantageously, due to steering the beam especially on the basis of the information received from the first flying object, the communication channel can be established and managed in a most efficient manner.

According to a first implementation form of the first aspect, additionally or alternatively, the at least one beamforming unit is configured to steer a beam not of the actual communication channel or an antenna of the mobile device being not the actual communication antenna based on the information received from the first flying object by the mobile device. This is particular advantageous because with special respect to a handover scenario, which is also called a handoff scenario, a connection between the mobile device and a flying object can therefore be passed to another flying object in a most efficient manner.

According to a further implementation form of the first aspect, the at least one beamforming unit is configured to steer each of the at least two beams independently from one another. Advantageously, this increases efficiency of beamforming.

According to a further implementation form of the first aspect, additionally or alternatively, the at least one beamforming unit is configured to steer each of the at least two beams simultaneously. This is particular advantageous because in this manner, efficiency of beamforming is further increased.

According to a further implementation form of the first aspect, the mobile device is static or movable.

According to a further implementation form of the first aspect, the mobile device receives information about position of at least one second flying object different from the first flying object in order to steer a beam to the second flying object. Advantageously, a handover, also called handoff, with respect to the first and the second flying object can be implemented in a most efficient manner.

According to a further implementation form of the first aspect, additionally or alternatively, the at least one beamforming unit is configured to steer the beam of the actual communication channel or the actual communication antenna of the mobile device based on position information of the mobile device. Advantageously, taking the own position of the mobile device into consideration in the context of beamforming, the communication channel can efficiently be established and managed.

According to a further implementation form of the first aspect, additionally or alternatively, the at least one beamforming unit is configured to steer a beam not of the actual communication channel or an antenna of the mobile device being not the actual communication antenna based on position information of the mobile device. This advantageously ensures an efficient handover, also known as handoff, with respect to two different flying objects.

According to a further implementation form of the first aspect, additionally or alternatively, the mobile device is configured to execute a scan on a determined area defined by the information received from the first flying object. In this manner, efficiency of the scan, especially of a scan for another flying objection for handing over or handing off the connection to the mobile device, is advantageously increased because it is not necessary to scan the whole area.

According to a second aspect of the invention, a method for wireless communication between at least one flying object and a mobile device comprising at least one beamforming unit for forming at least two beams is provided. The method comprises the steps of receiving information from a first flying object via an actual communication channel with the aid of the mobile device, and steering a beam of the actual communication channel or an actual communication antenna of the mobile device with the aid of the at least one beamforming unit based on the information received from the first flying object with the aid of the mobile device. Advantageously, due to steering the beam especially on the basis of the information received from the first flying object, the communication channel can be established and managed in a most efficient manner.

According to a first implementation form of the second aspect, the method further comprises the step of steering each of the at least two beams independently from one another with the aid of the at least one beamforming unit. Advantageously, this increases efficiency of beamforming.

According to a further implementation form of the second aspect, additionally or alternatively, the method further comprises the step of steering each of the at least two beams simultaneously with the aid of the at least one beamforming unit. This is particular advantageous because in this manner, efficiency of beamforming is further increased.

According to a further implementation form of the second aspect, the method further comprises the step of moving the mobile device or keeping the position of the mobile device constant.

According to a further implementation form of the second aspect, the method further comprises the step of receiving information about position of at least one second flying object different from the first flying object with the aid of the mobile device in order to steer a beam to the second flying object. Advantageously, a handover, also called handoff, with respect to the first and the second flying object can be implemented in a most efficient manner.

According to a further implementation form of the second aspect, additionally or alternatively, the method further comprises the step of steering the beam of the actual communication channel or the actual communication antenna of the mobile device based on position information of the mobile device with the aid of the at least one beamforming unit. Advantageously, taking the own position of the mobile device into consideration in the context of beamforming, the communication channel can efficiently be established and managed.

According to a further implementation form of the second aspect, additionally or alternatively, the method further comprises the step of steering a beam not of the actual communication channel or an antenna of the mobile device being not the actual communication antenna based on position information of the mobile device with the aid of the at least one beamforming unit. This advantageously ensures an efficient handover, also known as handoff, with respect to two different flying objects.

According to a further implementation form of the second aspect, the method further comprises the step of executing a scan on a determined area defined by the information received from the first flying object with the aid of the mobile device. In this manner, efficiency of the scan, especially of a scan for another flying objection for handing over or handing off the connection to the mobile device, is advantageously increased because it is not necessary to scan the whole area.

According to a third aspect of the invention, a communication system is provided. The communication system comprises a mobile device according to the first aspect of the invention and at least one flying object. In this context, the at least one flying object especially is a satellite or a drone or an airplane or any other kind of flying object.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements, and in which.

DETAILED DESCRIPTION

A mobile device and a method for wireless communication with at least one flying object (e.g., at least one satellite), in an efficient manner, including establishment and management of the respective communication channel, are described. In the following description, for the purposes of explanation, numerous specific details are set forth in order to provide a thorough understanding of the invention. It is apparent, however, that the invention may be practiced without these specific details or with an equivalent arrangement. In other instances, well-known structures and devices are shown in block diagram form in order to avoid unnecessarily obscuring the invention.

Figure 1:
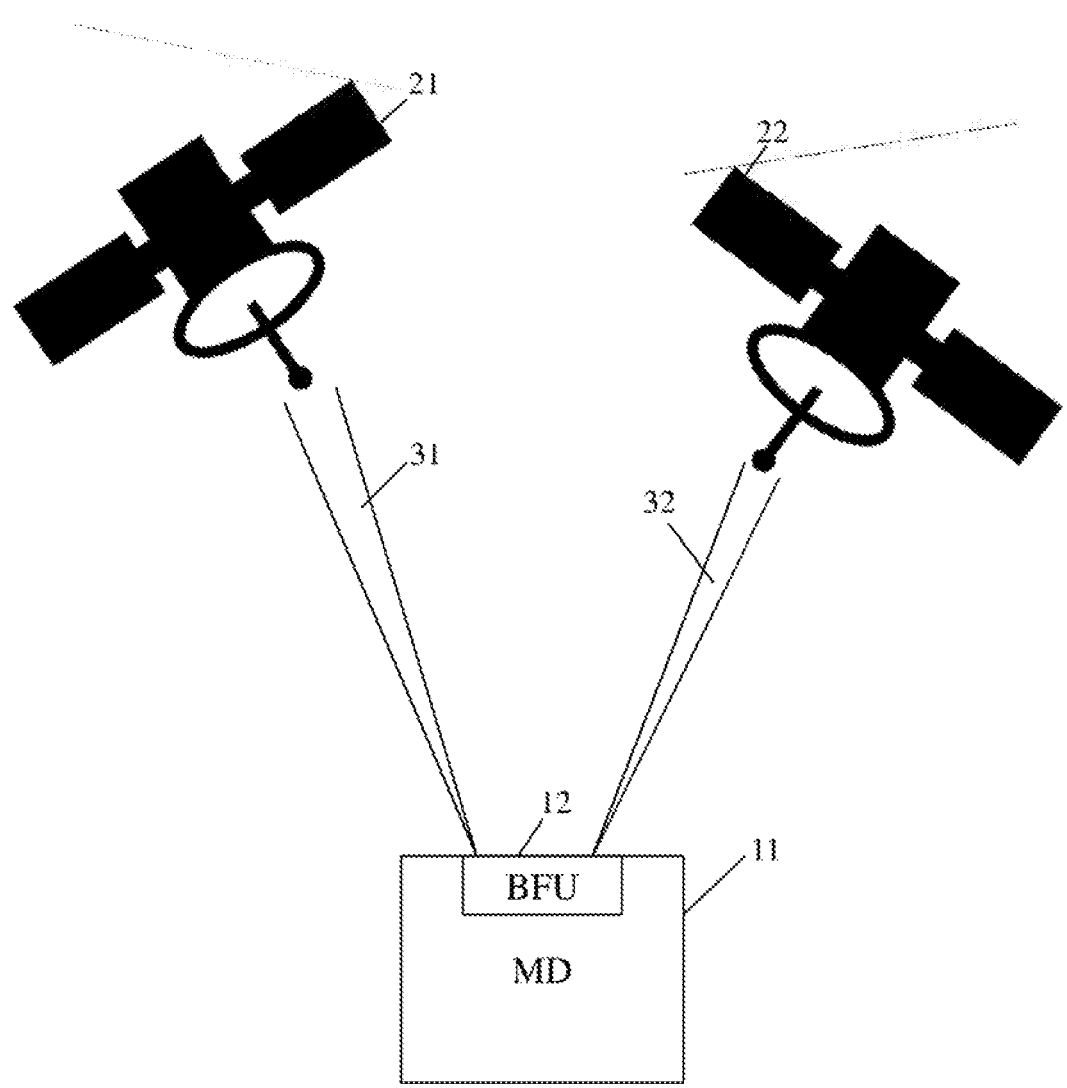
FIG. 1 shows a block diagram of a mobile device for wireless communication with at least one flying object, according to example embodiments of the present invention.

FIG. 1 shows a block diagram of a mobile device 11 for wireless communication with at least one flying object (such as at least one satellite), according to example embodiments of the present invention. In this case, the mobile device 11 may communicate with a first satellite 21 and a second satellite 22.

Furthermore, the mobile device 11 comprises a beamforming unit 12. In this case, the beamforming unit 12 forms a first beam 31 and a second beam 32.

Moreover, the beamforming unit 12 of the mobile device 11 steers the first beam 31 of an actual communication channel being especially equal to the communication channel between the first satellite 21 and the mobile device 11 on the basis of information received from the first satellite 21 by the mobile device 11. In other words, the first beam 31 (e.g., representing the actual communication channel between the mobile device 11 and the first satellite 21) is steered by the beamforming unit 12 based on information received via the actual communication channel from the first satellite 21.

Additionally, the beamforming unit 12 of the mobile device 11 steers the second beam 32 (e.g., of a further communication channel being equal to the communication channel between the second satellite 22 and the mobile device 11) on the basis of information received from the first satellite 21 by the mobile device 11. In other words, the second beam 32 (e.g., representing the further communication channel between the mobile device 11 and the second satellite 22) is steered by the beamforming unit 12 based on information received via the actual communication channel from the first satellite 21.

Accordingly, with respect to a handover scenario, also known as handoff scenario, the connection of the mobile device 11 to the first satellite 21 can advantageously be passed to the second satellite 22 in an efficient manner without any interruption.

In this context, the first beam 31 may serve for maintaining the connection of the mobile device 11, whereas the second beam 32 may serve for scanning for incoming satellites such as the second satellite 22. This scan (e.g., for incoming satellites) may be executed by the mobile device 11, such as on a determined area defined by the information received from the first satellite 21.

Additionally, the first satellite 21 may comprise a list of its neighboring satellites (such as the second satellite 22), which is part of the information received by the mobile device 11 from the first satellite 21. Said list of neighboring satellites may further comprise geographical data, (e.g., Kepler elements) of the neighbors or the second satellite 22, respectively.

Moreover, in addition or alternatively to steering the first beam 31 or the second beam 32 based on the information received from the first satellite 21, the first beam 31 or the second beam 32 may be steered with the aid of the beamforming unit 12 of the mobile device 11 on the basis of position information of the mobile device 11, such as based on the geographical position of the mobile device 11.

Further, the mobile device 11 may communicate with low earth orbit (LEO) satellites, geostationary satellites, medium earth orbit (MEO) satellites, nanosatellites, CubeSat satellites, drones, or any kind of flying object.

Figure 2:
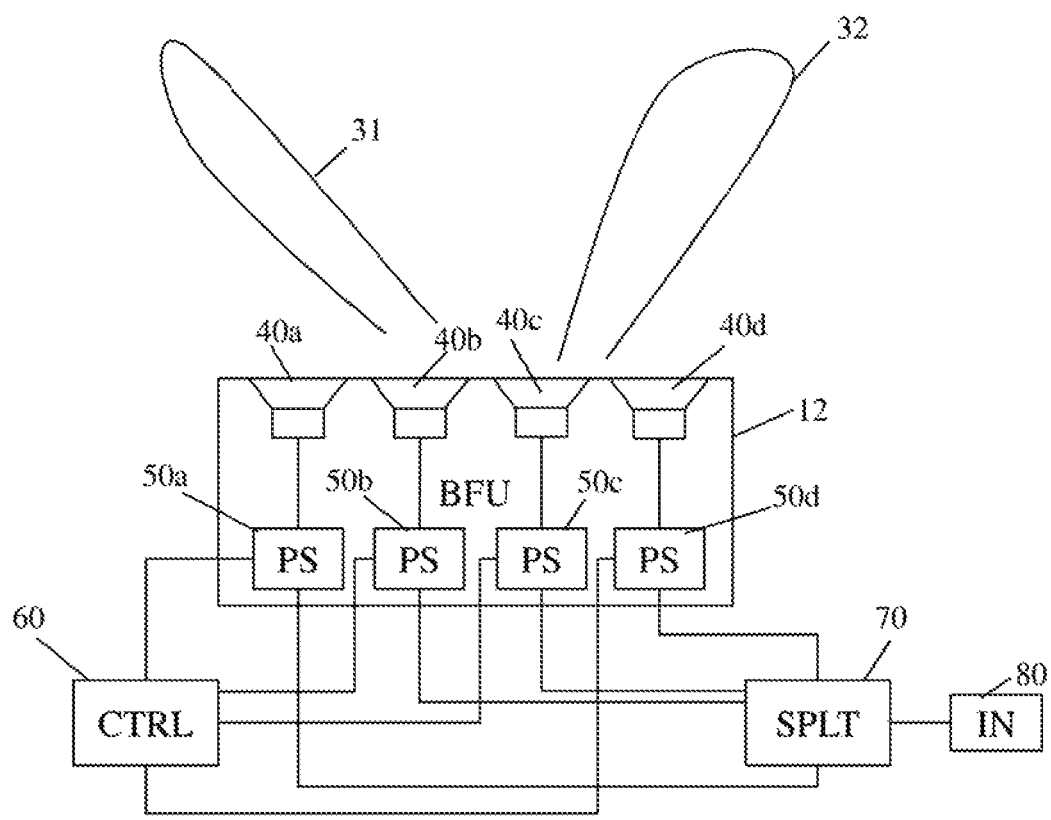
FIG. 2 shows a block diagram of a beamforming unit, according to example embodiments of the present invention.

FIG. 2 shows a block diagram of a beamforming unit, according to example embodiments of the present invention.

For forming the first beam 31 and the second beam 32, the beamforming unit 12 comprises an antenna array comprising antennas, such as horn antennas 40a, 40b, 40c, 40d. Each antenna is connected to a corresponding phase shifter 50a, 50b, 50c, 50d for shifting the phase of the respective signal in order to form the beams 31, 32 in the desired manner.

Each of the phase shifters 50a, 50b, 50c, 50d is connected to a signal splitter 70, which splits an input signal provided by an signal inputting unit 80, and provides the corresponding coherent signals for each of the phase shifters 50a, 50b, 50c, 50d. In addition to this, each of the phase shifters 50a, 50b, 50c, 50d is connected a controller 60 which controls the phase shifters 50a, 50b, 50c, 50d such that the beams 31, 32 are formed in the desired manner.

In this example, the controller 60 and the signal splitter 70 are not part of the beamforming unit 12. In this context, it is advantageous if at least one of the controller 60 and the signal splitter are part of the mobile device 11.

Further, advantageously, at least one of the controller 60 and the signal splitter 70 may be part of the beamforming unit 12. In other words, the beamforming unit 12 may comprise at least one of the controller 60 and the signal splitter 70.

Figure 3:
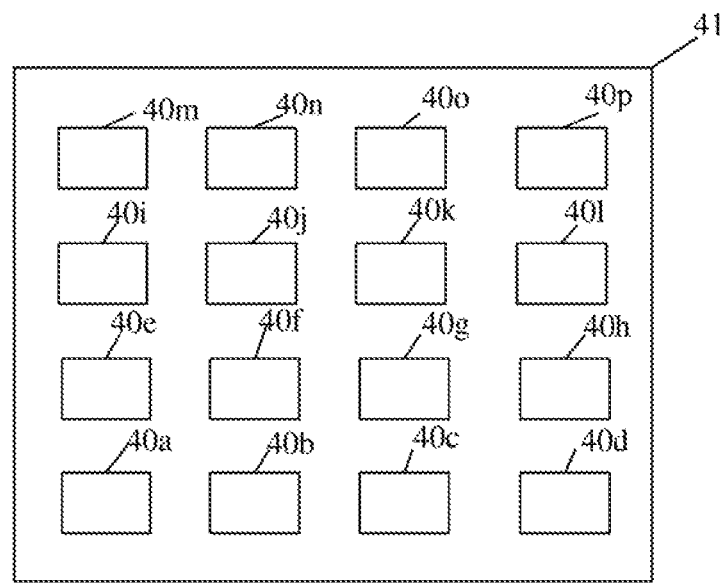
FIG. 3 shows a block diagram of an antenna array of a beamforming unit, according to example embodiments of the present invention.

FIG. 3 shows a block diagram of an antenna array 41 of a beamforming unit, according to example embodiments of the present invention. The antenna array comprises the antennas 40a, 40b, 40c, 40d of the beamforming unit 12, which may advantageously be expanded by further antennas 40e to 40p, as shown in the example antenna array 41 of FIG. 3. In this case, the antennas 40a to 40p are, for example, arranged in the form of a chessboard. Arranging the antennas 40a to 40p in such a manner advantageously leads to an optimal beamforming behavior.

Figure 4:
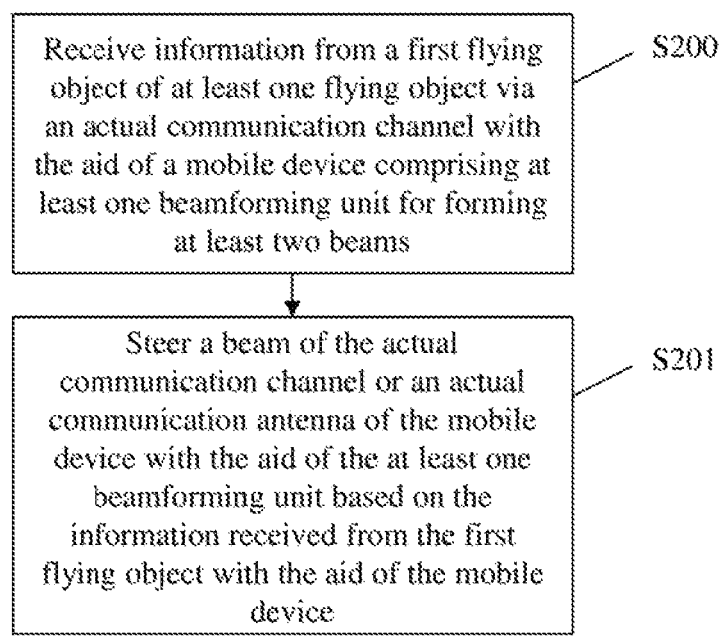
FIG. 4 shows a flow chart of a method for wireless communication between at least one flying object and a mobile device, according to example embodiments of the present invention.

FIG. 4 shows a flow chart of a method for wireless communication between at least one flying object and a mobile device, according to example embodiments of the present invention. In a first step S200, information from a first flying object of at least one flying object is received via an actual communication channel with the aid of a mobile device comprising at least one beamforming unit for forming at least two beams. Then, in a second step S201, a beam of the actual communication channel or an actual communication antenna of the mobile device is steered with the aid of the at least one beamforming unit based on the information received from the first flying object with the aid of the mobile device.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A mobile device for wireless communication with at least one flying object,
    wherein the mobile device is configured to receive information from a first flying object via a first communication channel between the mobile device and the first flying object,
    wherein the mobile device comprises at least one beamforming unit configured to form at least a first beam and a second beam,
    wherein the at least one beamforming unit is configured to steer the first beam of the first communication channel or a first communication antenna of the mobile device based on the information received from the first flying object by the mobile device,
    wherein the mobile device is configured to receive information about a position of at least one second flying object different from the first flying object,
    wherein the at least one beamforming unit is configured to steer the second beam of a second communication channel or a second communication antenna of the mobile device to the second flying object,
    wherein the first beam serves for maintaining the first communication channel between the mobile device and the first flying object, and the second beam serves for scanning by the mobile device for the second flying object, wherein the scanning is of a determined area defined by the information received from the first flying object,
    wherein the mobile device comprises a signal splitter and a plurality of phase shifters, wherein the signal splitter is configured to split an input signal to provide coherent signals for each of the phase shifters such that the first beam and the second beam are formed in a desired manner, and
    wherein the at least one beamforming unit is configured to steer a further communication channel between the mobile device and the second flying object based on the information received from the first flying object by the mobile device via the first communication channel.

2. The mobile device according to claim 1, wherein the at least one beamforming unit is configured to steer the second beam based on the information received from the first flying object by the mobile device.

3. The mobile device according to claim 1, wherein the at least one beamforming unit is configured to steer each of the at least two beams independently from one another.

4. The mobile device according to claim 1, wherein the at least one beamforming unit is configured to steer each of the at least two beams simultaneously.

5. The mobile device according to claim 1, wherein the mobile device is static or movable.

6. The mobile device according to claim 1, wherein the at least one beamforming unit is configured to steer the first beam of the first communication channel or the first communication antenna of the mobile device based on position information of the mobile device.

7. The mobile device according to claim 1, wherein the at least one beamforming unit is configured to steer the second beam of the second communication channel or the second communication antenna of the mobile device based on position information of the mobile device.

8. The mobile device according to claim 1, wherein the mobile device is configured to execute a scan for the second flying object based on a determined area defined by the information received from the first flying object.

9. A method for wireless communication between at least one flying object and a mobile device, the method comprising the steps of:
- receiving, by the mobile device, information from a first flying object via a first communication channel between the mobile device and the first flying object,
- forming, by a beamforming unit of the mobile device, at least a first beam and a second beam, and
- steering, by the beamforming unit of the mobile device, the first beam of the first communication channel or a first communication antenna of the mobile device based on the information received from the first flying object by the mobile device,
- receiving, by the mobile device, information about a position of at least one second flying object different from the first flying object,
- steering, by the beamforming unit of the mobile device, the second beam of a second communication channel or a second communication antenna of the mobile device based on the information received from the first flying object about the position of the at least one second flying object,
- splitting an input signal to provide coherent signals for each of a plurality of phase shifters such that the first beam and the second beam are formed in a desired manner, and
- steering, by the beamforming unit of the mobile device, a further communication channel based on the information received from the first flying object by the mobile device via the first communication channel, and
wherein the first beam serves for maintaining the first communication channel between the mobile device and the first flying object, and the second beam serves for scanning by the mobile device for the second flying object, wherein the scanning is of a determined area defined by the information received from the first flying object.

10. The method according to claim 9, wherein the at least two beams are steered independently from one another.

11. The method according to claim 9, wherein each of the at least two beams are steered simultaneously.

12. The method according to claim 9, wherein the mobile device is static or movable.

13. The method according to claim 9, wherein the first beam of the first communication channel or the first communication antenna of the mobile device is steered based on position information of the mobile device.

14. The method according to claim 9, wherein the second beam of the second communication channel or the second communication antenna of the mobile device is steered based on position information of the mobile device.

15. The method according to claim 9, wherein the method further comprises the step of executing, by the mobile device, a scan for the second flying object based on a determined area defined by the information received from the first flying object.

16. A communication system, wherein the system comprises a mobile device according to claim 1 and at least one flying object, wherein the at least one flying object is a satellite or a drone or an airplane or any other kind of flying object.

* * * * *